3,769,237
OXIDANT-CATALYST MIXTURE OF BISMUTH OXIDE AND CHROMIA-ALUMINA

John A. Ondrey, Tyler, Tex., and Harold E. Swift, Gibsonia, Pa., assignors to Gulf Research & Development Company, Pittsburgh, Pa.
No Drawing. Division and a continuation-in-part of application Ser. No. 818,068, Apr. 21, 1969, now Patent No. 3,644,551. This application May 13, 1971, Ser. No. 143,260

Int. Cl. B01j *11/06*
U.S. Cl. 252—464                                  13 Claims

ABSTRACT OF THE DISCLOSURE

A solid, particulate catalyst-oxidant mixture comprising a 1:1 to 20:1 mixture of particles of bismuth oxide intermixed with separate particles of chromia-alumina. This mixture can be used to convert isobutylene to para-xylene.

---

This application is a division and a continuation-in-part of U.S. patent application Ser. No. 818,068, filed Apr. 21, 1969, now Pat. No. 3,644,551.

This invention relates to a novel oxidant-catalyst composition comprising bismuth oxide as the oxidant and chromia-alumina as the catalyst. The composition is composed of particles of bismuth oxide intermixed with separate particles of chromia-alumina. The weight ratio of bismuth oxide to chromia-alumina ranges from about 1:1 to about 20:1. This oxidant-catalyst composition is particularly suited for the one-stage oxydehydrocyclodimerization of three and four carbon paraffins and mono-olefins. By oxydehydrocyclodimerization is meant a process involving a number of concurrent and/or consecutive reactions including oxidation, dehydrogenation, dimerization, cyclization and so forth.

Paraffins, particularly three and four carbon paraffins, are large volume products in refinery operations which are sold at very low cost, primarily for fuel. Olefins, particularly three and four carbon mono-olefins, are a large volume by-product of various other refinery operations. Since their combustion characteristics are generally undesirable, they cannot find a significant outlet in gaseous or LPG fuels. However, in view of their chemical reactivity these three and four carbon mono-olefins are generally utilized by upgrading by chemical reaction into chemical products of greater value than the starting olefins. The process using this oxidant-catalyst mixture can upgrade these paraffins or mono-olefins as well as mixtures of paraffins and these olefins by chemical reaction.

It is known that a three or four carbon paraffin can be converted in three stages into significant yields of aromatic compounds by dehydrogenating the paraffin at specific conditions over a suitable catalyst in a first stage, then dimerizing the resulting olefin at different conditions over a different catalyst in the second stage and then cyclizing the dimer by recycling it back to the first stage.

We have discovered a novel mixture of bismuth oxide and chromia-alumina which can be used for the single-stage conversion of three and four carbon paraffins and/or mono-olefins to aromatic compounds. That this one-stage reaction takes place is highly surprising for a number of reasons. First, it is highly unexpected that the series of reactions taking place to convert the paraffin or the mono-olefin to the cyclic dimer occur at comparable rates at the same temperature. Second, it is known that hydrogen easily reduces bismuth oxide to bismuth metal and therefore it is very surprising that the hydrogen produced by the dehydrogenating and dehydrocyclizing reactions taking place has no apparent effect on the bismuth oxide. Third, chromia-alumina is known to be deactivated by water vapor, and therefore it is very surprising that the chromia-alumina is not affected by the water vapor produced in the one-stage process by the oxydehydrogenation reactions taking place. For example, it has been demonstrated with an isobutane feed in a three-stage operation using chromia-alumina in the first stage, bismuth oxide in the second stage and chromia-alumina in the third stage that the bismuth oxide is reduced in the second stage by the hydrogen produced in the first stage, and the chromia-alumina in the third stage is substantially deactivated by the water produced in the second stage reaction involving the bismuth oxide. Yet when the bismuth oxide and chromia-alumina are mixed to form a mixture of the particles of bismuth oxide and separate particles of chromia-alumina and the reaction is undertaken in one stage, the chromia-alumina is not significantly affected by the water vapor and the bismuth oxide is not significantly affected by the hydrogen, both of which are shown to be present by analysis of the product stream.

The relative amount of bismuth oxide and chromia-alumina is a factor affecting the course of the reaction of the paraffin and/or olefin to the aromatic compound. A weight ratio of bismuth oxide, not including the support if it is supported, to chromia-alumina between about 1:1 and 20:1 can be used successfully with a weight ratio between about 2:1 to about 10:1 being preferred, and between about 3:1 and about 4:1 being most preferred. When the weight ratio of bismuth oxide to chromia-alumina goes above about 20:1, the primary products are the linear diolefins with only minor amounts of the cyclic and aromatic compounds. As the weight ratio goes below about 1:1, coking, cracking and polymerization become excessive. The large amount of hydrogen formed under these conditions has a tendency to reduce the bismuth oxide to free bismuth metal.

The bismuth oxide is a reactant which provides oxygen for reaction. It can conveniently be prepared by the thermal decomposition of a suitable bismuth compound, that is a compound that thermally decomposes to bismuth oxide such as bismuth nitrate, bismuth carbonate, bismuth hydroxide, bismuth acetate, etc. The bismuth compound is formed into suitably sized particles such as about 5 to 10 mesh size or smaller up to about ⅜ inch pellets or larger and calcined in air. The surface area of the resulting material is generally relatively low, that is about 0.1 to about 10 square meters per gram. Other metal oxides, such as zinc oxide, magnesia, calcium oxide, titanium dioxide and the like, can be incorporated in the bismuth oxide for the purpose of aiding in its formation, reducing physical attrition and increasing the stability of the bismuth oxide towards reduction. In the reaction taking place oxygen is extracted from the crystal lattice of the bismuth oxide. This bismuth oxide is capable of losing a substantial amount of its oxygen, that is, up to about 60 percent without damage to its lattice structure. Regeneration of the partially spent bismuth oxide can be accomplished by heating it in air and this should take place before excess oxygen is removed from the crystal lattice to prevent a collapsing of the crystal lattice structure and a coalescing of bismuth metal.

The bismuth oxide can also be formed on a support by impregnating a solution of a bismuth compound onto a suitable support, and then drying and calcining it. The support can have a surface area of between about .05 to about 200 m.$^2$/g., preferably between about .05 and about 5 m.$^2$/g. and most preferably less than about 1 m.$^2$/g. Suitable supports include fused aluminum oxide, alumina, silica-alumina, silica, silicon carbide, magnesia, zirconium oxide, and the like. The most suitable support has been found to be a fused aluminum oxide. It has been found that the bismuth oxide on a suitable support can lose up to about 80 percent of its lattice oxygen without damage to its lattice structure, and can physically withstand repeated cycles of reaction-regeneration with a minimum attrition to fines better than the unsupported bismuth oxide. We consider it desirable that the supported bismuth oxide contain at least about five weight percent bismuth oxide and preferably at least about 10 weight percent bismuth oxide in order to have sufficient bismuth oxide available for reaction. The maximum amount of bismuth oxide that can be incorporated on a support without wearing or flaking off generally is about 20 to 30 percent and varies with the support, thus the broad range of bismuth oxide on the support is from about five to about 30 weight percent.

The chromia-alumina functions as a catalyst in the mixture. It can be any chromia-alumina material, preferably of conventional manufacture and composition. For example, preformed alumina particles can be treated with a suitable solution of a chromium compound and the resulting impregnated particles pelleted, dried and calcined to produce the resulting chromia-alumina material. We find that chromia-alumina compositions containing from about five to about 50 mol percent chromia are satisfactory with the preferred chromia-alumina compositions containing from about 10 to about 22 mol percent chromia. The chromia-alumina composition can be promoted with a conventional promoter material such as potassium, sodium, silicon, etc., in an amount up to about three to five percent calculated as the oxide. It is preferred that the particle size of the chromia-alumina be similar to that of the bismuth oxide. If the particle size of either constituent is too small, an undesirably large pressure drop across the catalyst bed may result. The finished catalyst can be conveniently prepared by randomly mixing the chromia-alumina with the bismuth oxide. Also, up to about 90 weight percent of an inert material based on the bimuth oxide such as silicon carbide, alpha alumina, zirconium oxide and the like can be mixed with the oxidant-catalyst mixture to serve as a dispersant or a diluent, when unsupported bismuth oxide is used, to help dissipate the heat of reaction. This inert diluent is not necessary when supported bismuth oxide is used and when used, is preferably of a particle size similar to the other constituents.

This mixture of bismuth oxide and chromia-alumina is particularly suitable for converting propane, n-butane and isobutane; propylene, 1-butene, 2-butene and isobutene; and mixtures of these to higher molecular weight cyclic dimers, particularly the aromatic, dimers. The primary product from propane and propylene is benzene and that from isobutane and isobutene is para-xylene. The n-butanes and n-butenes react very similarly. Also olefins represented by the formula $CH_2=CX-CH_2R$ in which R is hydrogen or methyl and X is halogen (fluorine, chlorine, bromine and iodine), nitrile, phenyl, isocyanate, halogen substituted methyl, halogen and alkyl substituted phenyl, etc., can be cyclodimerized using this oxidant-reactant mixture. The group represented by X will occur on the benzene ring of the product aromatic compound in the para position as the predominant product. For example, methacrylonitrile is converted to terephthalonitrile. The overall, single stage conversion process probably includes the following specific, sequentially occurring and/or competitive reactions, that is dehydrogenation, oxydehydrogenation, dehydrodimerization, isomerization, oxydehydrodimerization, dehydrocyclization as well as others.

An inert diluent gas such as nitrogen, methane, helium, argon, etc. can be added to the feed to control the overall reaction. By adding an inert gas to the feed at otherwise constant conditions less per pass conversion of the feed occurs and this tends to stabilize the bismuth oxide against reduction to the free bismuth metal. Furthermore, the addition of the inert gas has a tendency to reduce the formation of carbon oxides and decreases the dealkylation of the alkyl groups in the cyclic product. However, this increase of inert diluent tends to decrease the selectivity of the reaction to the cyclic compounds in favor of linear diolefins. The amount of inert diluent that is useful generally ranges from 0 to about 80 perecnt of the feed stream. It is preferred, however, not to exceed 50 percent inert diluent in the feed stream.

A temperature of at least about 425° C. is required for a significant conversion of the mono-olefins to the cyclic dimers and a minimum temperature of at least 475° C. is required for a significant conversion of the paraffins to the cyclic dimers. As the temperature is increased, the conversion increases until at about 575° C. the reaction starts to become unselective resulting in the formation of significant amounts of carbon oxides, coke and higher hydrocarbons. Also at the higher temperatures there is a tendency to overreduce the bismuth oxide to free bismuth metal. Above about 625° C. the reaction to undesired products becomes so significant that operation at this high temperature is undesirable. Since a temperature gradient tends to form in the catalyst bed, the operating temperature as described herein is the maximum temperature occurring in the catalyst bed.

The space time, that is, the reciprocal of the gas hourly space velocity, is a factor in establishing the general course of the reaction. If the space time is too long, there is a tendency to form coke, polymer and crack the starting material and products. Also, at long space times the tendency to reduce bismuth oxide to free metal increases. If the space time is too short, there is a significant decrease in the conversion of the feed with a lowered selectivity to the cyclic products. A gas hourly space velocity (GHSV) of about 15 to about 300, specified in terms of olefin feed and the catalytic material, is satisfactory. A pressure of about atmospheric to about 25 p.s.i.g. is satisfactory for the reaction.

After the reaction has proceeded for such time that the bismuth oxide has lost a significant amount of its lattice oxygen but prior to damage of the lattice structure, the bismuth oxide is regenerated by reoxidizing the oxidant-catalyst mixture with a suitable oxidizing gas such as pure oxygen or air preferably at the temperature of reaction. Therefore, the reaction can be carried out in a cyclic operation with the reaction in one cycle and regeneration in a second cycle. For continuous operation it is desirable to have two reactors such that a continuous stream of reacting gas flows through one of two reactors while the second one is regenerated. The cycle is periodically reversed. In order to obtain the best benefits from the reaction, it is desirable to separate unreacted paraffin or mono-olefin from the product stream and recycle it to the feed stream.

We now describe our invention by way of specific examples, however, these examples are not to be construed in any manner as limiting our invention.

EXAMPLE 1

A reactor constructed of 20 mm. ID quartz tubing, 42 cm. in length was used for these experiments. The reactor was heated by means of a tube furnace and a six-point multicouple was placed in a 5 mm. OD thermowell extending the length of the catalyst zone. The oxidant-catalyst mixture was held in place by means of a quartz wool support. Silicon carbide was placed above the catalyst zone to serve as a preheat section and as a gas mixer.

An oxidant-catalyst mixture made up of 14 cc. of particles of $Bi_2O_3$ (38 g.), 6 cc. of particles of chromia-alumina (5.1 g.) and 20 cc. of particles of silicon carbide, randomly mixed together, was placed in the reactor. The chromia-alumina contained 19.8 percent chromia and was doped with 0.28 percent sodium. The mixture of solid particles was preheated in air for one hour at 525° C. A stream of isobutene was then passed through the reactor at 25 cc. per minute to give a gas hourly space velocity of about 75 based on the active catalyst material and about 107 based on the bismuth oxide alone. The reaction was conducted for one hour at 525° C. resulting in 17.5 percent conversion of the isobutene with 75 percent selectivity to dimerized products. These dimerized products included 79.3 weight percent para-xylene, 3.6 percent toluene, 3.0 percent benzene for a total of 85.9 percent aromatic compound. The remainder of the dimerized products was 6.2 percent 2,5-dimethyl-2,4-hexadiene, 5.8 percent 2,5-dimethyl-1,5-hexadiene and 2.1 percent diisobutylene.

EXAMPLE 2

An experiment was conducted identical with that carried out under Example 1 except that 20 cc. of particles of bismuth oxide (54 g.) mixed with 20 cc. of particles of silicon carbide was used giving a gas hourly velocity of 75 based on the bismuth oxide. A 22.2 percent conversion of the isobutene was obtained after one hour with a 77 percent selectivity to dimerized products. Of these dimerized products 52.9 weight percent were aromatic compounds distributed as follows: 38.0 percent para-xylene, 9.4 percent toluene and 5.5 percent benzene with the remainder of the dimer product consisting of 44.0 percent 2,5-dimethyl-1,5-hexadiene and 3.1 percent diisobutylene. The slightly higher conversion in this example results from the lower space velocity based on bismuth oxide and the higher bismuth oxide available for reaction. It is noted that there was very little 2,5-dimethyl-2,4-hexadiene present in this product indicating that isomerization is taking place in Example 1. This example illustrates the importance of the chromia-alumina in increasing the selectivity to aromatic compounds.

EXAMPLE 3

Example 1 was repeated except that the feed was 1-butene and the reactant-catalyst mixture was made up from 12 cc. of particles of bismuth oxide, 8 cc. of particles of chromia-alumina and 20 cc. of particles of silicon carbide. One hour of operation resulted in a conversion of 20 percent and a selectivity of 80 percent to dimerized products of which about 85 percent were cyclic dimers including 4-vinylcyclohexene-1, styrene, toluene, ethyl benzene and mixed xylenes.

EXAMPLE 4

A reactant-catalyst mixture consisting of 10 cc. of particles of bismuth oxide, 5 cc. of particles of chromia-alumina and 10 cc. of particles of silicon carbide was placed in the reactor and preheated with air at 550° C. for one hour. 2-butene was then fed into the reactor with reaction taking place at 550° C. Table I sets forth the results of varying the space velocity which is based on the active constituents in the catalyst.

TABLE I

| GHSV | Conversion, percent | Selectivity to dimers, percent | Yield, dimers, percent |
|---|---|---|---|
| 40 | 20.6 | 75 | 15.5 |
| 60 | 20 | 82 | 16.4 |
| 85 | 22.8 | 87 | 19.9 |
| 110 | 20.5 | 89 | 18.2 |
| 135 | 16.4 | 90 | 14.6 |

EXAMPLE 5

A mixture of 20 cc. of bismuth oxide, 9 cc. of chromia-alumina and 15 cc. of silicon carbide was charged to the reactor. Air was passed over the catalyst at 550° C. for one hour, then it was flushed with nitrogen for 5 to 10 minutes. Propylene was passed over the catalyst mixture at a GHSV of 41 (based on total catalyst) for one hour at 550° C. After several reaction-regeneration cycles, the propylene conversion lined-out at about 10 percent. The organic condensate contained 7.2 mol percent 1,5-hexadiene, 10.6 mol percent 1,3-cyclohexadiene, 72 mol percent benzene and 10.2 mol percent of what is believed to be a propylene trimer. Of the propylene converted approximately 10 percent went to carbon dioxide.

EXAMPLE 6

A supported bismuth oxide was prepared by dissolving the amount of $Bi(NO_3)_3 \cdot 5H_2O$ calculated to form 18 weight percent bismuth oxide on the support in a minimum of 6 N nitric acid, stirring in 100 grams of the support, and evaporating the mixture to dryness. The bismuth salt which did not adhere to the support was redissolved in nitric acid and poured on the support. The support was then dried and calcined in air at 550° C. for about 10 hours. The resulting supported oxidant contained 18 weight percent bismuth oxide. The support was type AMM alumina obtained from the Carborundum Company. It was a fused aluminum oxide having a surface area of about 0.1 m.$^2$/g. The resulting supported bismuth oxide particles were 6 to 8 mesh in size.

A random mixture of 33.1 g. (25 cc.) of these particles with 15.4 volume percent of 10 to 20 mesh chromia-alumina having a surface area of 128 m.$^2$/g. and containing 12 weight percent chromia, 4 percent silica and 2 percent potassium oxide was placed in the reactor. Isobutylene mixed with 10 volume percent nitrogen was passed through this oxidant-catalyst bed at a temperature of 540° C. and a flow rate based on the isobutylene of 46 cc./min. The total conversion was 20 percent at a selectivity of 56.8 mol percent to the xylenes, primarily para-xylene.

This oxidant-catalyst mixture of bismuth oxide and chromia-alumina is very convenient and inexpensive for the conversion of low cost-paraffins and/or olefins into upgraded aromatic products. In utilizing this process on a commercial scale, the paraffin and/or olefin in the product stream is preferably separated from this product stream and is recycled to extinction, that is, 100 percent conversion of the feed material can be obtained by recycling the paraffins and mono-olefins in the product stream.

It is to be understood that the above disclosure is by way of specific example and that numerous modifications and variations are available to those of ordinary skill in the art without departing from the true spirit and scope of the invention.

We claim:

1. A solid oxidant-catalyst composition comprising a mixture of particles of bismuth oxide oxidant randomly mixed with separate particles of chromia-alumina catalyst, the weight ratio of bismuth oxide to chromia-alumina in said random mixture being between about 20:1 and about 1:1.

2. A solid oxidant-catalyst composition in accordance with claim 1 in which the bismuth oxide is unsupported.

3. A solid oxidant-catalyst composition in accordance with claim 2 in which the ratio of bismuth oxide to chromia-alumina is between about 2:1 and about 10:1.

4. A solid oxidant-catalyst composition in accordance with claim 3 in which the ratio of bismuth oxide to chromia-alumina is between about 3:1 to about 4:1.

5. A solid oxidant-catalyst composition in accordance with claim 2 in which the composition comprises up to about 90 weight percent of particles of an inert material.

6. A solid oxidant-catalyst composition in accordance with claim 1 in which the said particles are substantially the same in size.

7. A solid oxidant-catalyst composition in accordance with claim 1 in which the bismuth oxide is on a support, said supported bismuth oxide comprising from about 5 to about 30 weight percent bismuth oxide.

8. A solid oxidant-catalyst composition in accordance with claim 7 in which the ratio of bismuth oxide to chromia-alumina is between about 2:1 and about 10:1.

9. A solid oxidant-catalyst composition in accordance with claim 8 in which the ratio of bismuth oxide to chromia-alumina is between about 3:1 to about 4:1.

10. A solid oxidant-catalyst composition in accordance with claim 1 in which the bismuth oxide is on a support, said supported bismuth oxide comprising from about 10 to about 20 to 30 weight percent bismuth oxide.

11. A solid oxidant-catalyst composition in accordance with claim 1 in which the particles of bismuth oxide are between about five to ten mesh up to about 3/8 inch in size and the particles of chromia-alumina are between about five to ten mesh up to about 3/8 inch in size.

12. A solid oxidant-catalyst composition in accordance with claim 1 in which the chromina is between about five and about 50 mol percent of the chromia-alumina particles.

13. A solid oxidant-catalyst composition in accordance with claim 12 in which the chromia is between about 10 and about 22 mol percent of the chromia-alumina particles.

References Cited
UNITED STATES PATENTS

| | | | |
|---|---|---|---|
| 2,967,821 | 1/1961 | Moy et al. | 252—465 X |
| 3,027,413 | 3/1962 | Moy et al. | 260—672 R |
| 2,684,951 | 7/1954 | Mottern | 252—464 X |
| 3,179,602 | 4/1965 | Gremillion | 252—465 |
| 3,374,281 | 3/1968 | Csicsery | 260—673 |

DANIEL E. WYMAN, Primary Examiner

W. J. SHINE, Assistant Examiner

U.S. Cl. X.R.

252—465